US012272888B2

(12) United States Patent
Chang et al.

(10) Patent No.: US 12,272,888 B2
(45) Date of Patent: Apr. 8, 2025

(54) ELECTRONIC DEVICE AND ANTENNA FEEDING MODULE

(71) Applicant: WISTRON NEWEB CORPORATION, Hsinchu (TW)

(72) Inventors: Hsuan-Jui Chang, Hsinchu (TW); Yun-Tsan Lee, Hsinchu (TW); Chia-Hao Chang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 720 days.

(21) Appl. No.: 17/403,938

(22) Filed: Aug. 17, 2021

(65) Prior Publication Data

US 2022/0320740 A1 Oct. 6, 2022

(30) Foreign Application Priority Data

Mar. 31, 2021 (TW) .................................. 110111907

(51) Int. Cl.

*H01Q 9/42* (2006.01)
*H01Q 13/10* (2006.01)
*H01Q 1/22* (2006.01)

(52) U.S. Cl.

CPC ............... *H01Q 9/42* (2013.01); *H01Q 13/10* (2013.01); *H01Q 1/2266* (2013.01)

(58) Field of Classification Search

CPC ....... H01Q 13/10; H01Q 1/2266; H01Q 1/243
See application file for complete search history.

(56) References Cited

U.S. PATENT DOCUMENTS

2016/0294067 A1* 10/2016 Chang .................... H01Q 5/364
2018/0342809 A1* 11/2018 Wu ........................ H01Q 5/371

FOREIGN PATENT DOCUMENTS

TW M553500 U 12/2017
TW I627794 B 6/2018

* cited by examiner

*Primary Examiner* — Graham P Smith
(74) *Attorney, Agent, or Firm* — McClure, Qualey & Rodack, LLP

(57) ABSTRACT

An electronic device and an antenna feeding module are provided. The electronic device includes a metal housing and an antenna feeding module. The metal housing is provided with a slot with an opening end and a closed end. The antenna feeding module includes a carrier board and a feeding circuit. The feeding circuit includes a feeding element and a radiating element. The radiating element includes a coupling portion, a radiating branch and a feeding portion. There is a coupling gap between the coupling portion and the metal housing, and the coupling gap is less than 0.5 times the width of the slot. The feeding circuit is used to excite the metal housing, so that the metal housing and the radiating element generate a first resonance path with a first resonance mode and a second resonance path with a second resonance mode.

8 Claims, 10 Drawing Sheets

ELECTRONIC DEVICE AND ANTENNA FEEDING MODULE

CROSS-REFERENCE TO RELATED PATENT APPLICATION

This application claims the benefit of priority to Taiwan Patent Application No. 110111907, filed on Mar. 31, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device and an antenna feeding module, in particular to an electronic device and an antenna feeding module that can meet the requirements of broadband operation in the low frequency/high frequency band.

BACKGROUND OF THE DISCLOSURE

At present, portable electronic devices (for example, laptops) are increasingly sophisticated in design, and their product appearances are all geared toward a thin and wide-screen design. In this case, the antenna structure assembled inside the product needs to be set on the base part of the product with a metal housing, so the antenna performance is easily affected. In addition, after the publication of the IEEE 802.11ax standard, the operating frequency band of the antenna structure in the current electronic device has been unable to meet the broadband requirements of WI-FI®6E.

Therefore, how to overcome the above-mentioned shortcomings through the improvement of structural has become one of the important issues to be solved by this business.

SUMMARY OF THE DISCLOSURE

In response to the above-referenced technical inadequacies, the present disclosure provides an electronic device and an antenna feeding device.

In one aspect, the present disclosure provides an electronic device. The electronic device includes a metal housing, a carrier board, and a feeding circuit. The metal housing has a slot. The slot has an opening end and a closed end. The carrier board is disposed in the metal housing. The feeding circuit is disposed on the carrier board. The feeding circuit includes a feeding element and a radiating element. The vertical projection of the radiating element on the metal housing at least partially overlaps the slot. The radiating element includes a coupling portion, a radiating branch, and a feeding portion. The radiating branch is disposed between the coupling portion and feeding portion. The feeding portion is connected to the feeding element. There is a coupling gap between the coupling portion and the metal housing. The coupling gap is smaller than 0.5 times the width of the slot. The feeding circuit is used to excite the slot of the metal housing so that the metal housing and the radiating element generate a first resonance path with a first resonance mode. The coupling portion and the metal housing are coupling to each other to form an electrical path and a second resonance path with a second resonance mode is generated. The first resonance mode is different from the second resonance mode.

In another aspect, the present disclosure provides an antenna feeding module. The antenna feeding module is disposed in the metal housing with a slot. The antenna feeding module includes a carrier board and a radiating element. The carrier board is disposed in the metal housing. The radiating element is disposed on the carrier board, the vertical projection of the radiating element on the metal housing at least partially overlaps the slot. The radiating element includes a coupling portion, a radiating branch and a feeding portion. The radiating branch is disposed between the coupling portion and the feeding portion. The feeding portion is connected to the feeding element. There is a coupling gap between the coupling portion and the metal housing. The width of the coupling gap is less than 0.5 times the width of the slot.

In yet another aspect, the present disclosure provides an electronic device. The electronic device includes a metal housing, a carrier board, and a feeding circuit. The metal housing has a slot. The slot has an opening end and a closed end. The carrier board is disposed in the metal housing. The feeding circuit is disposed on the carrier board. The feeding circuit includes a feeding element, a radiating element, a capacitor element and a connecting element. The vertical projection of the radiating element on the metal housing at least partially overlaps the slot. The radiating element includes a radiating branch and a feeding portion. The feeding portion is connected to the feeding element. The capacitor element is electrically connected to the radiating element. The connecting element is connected between the radiating element and the metal housing. The feeding circuit is used to excite the slot of the metal housing so that the metal housing and the radiating element generate a first resonance path with a first resonance mode or a second resonance path with a second resonance mode. The first resonance mode is different from the second resonance mode.

In yet another aspect, the present disclosure provides an antenna feeding module. The antenna feeding module is disposed in the metal housing with a slot. The antenna feeding module includes a carrier board, a radiating element, a capacitor element and a connecting element. The carrier board is disposed in the metal housing. The radiating element is disposed on the carrier board. The vertical projection of the radiating element on the metal housing at least partially overlaps the slot. The radiating element includes a radiating branch and a feeding portion. The feeding portion is connected to the feeding element. The capacitor element is electrically connected to the radiating element. The connecting element is connected between the radiating element and the metal housing.

One of the beneficial effects of the present disclosure is that the electronic device and antenna feeding module provided by the present disclosure through technical solutions of "feeding circuit exciting the metal housing, so that the coupling portion and the metal housing are mutually coupling to each other to form an electrical path and "the capacitor element electrically connected to the radiating element, and the connecting element connected between the radiating element and the metal housing". To achieve the wide-frequency operation requirements of the low-frequency/high-frequency band is by utilizing the low-frequency/high-frequency characteristics of virtual coupling capacitor or physical capacitor element to configure the metal housing with a slot to have different resonance paths.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
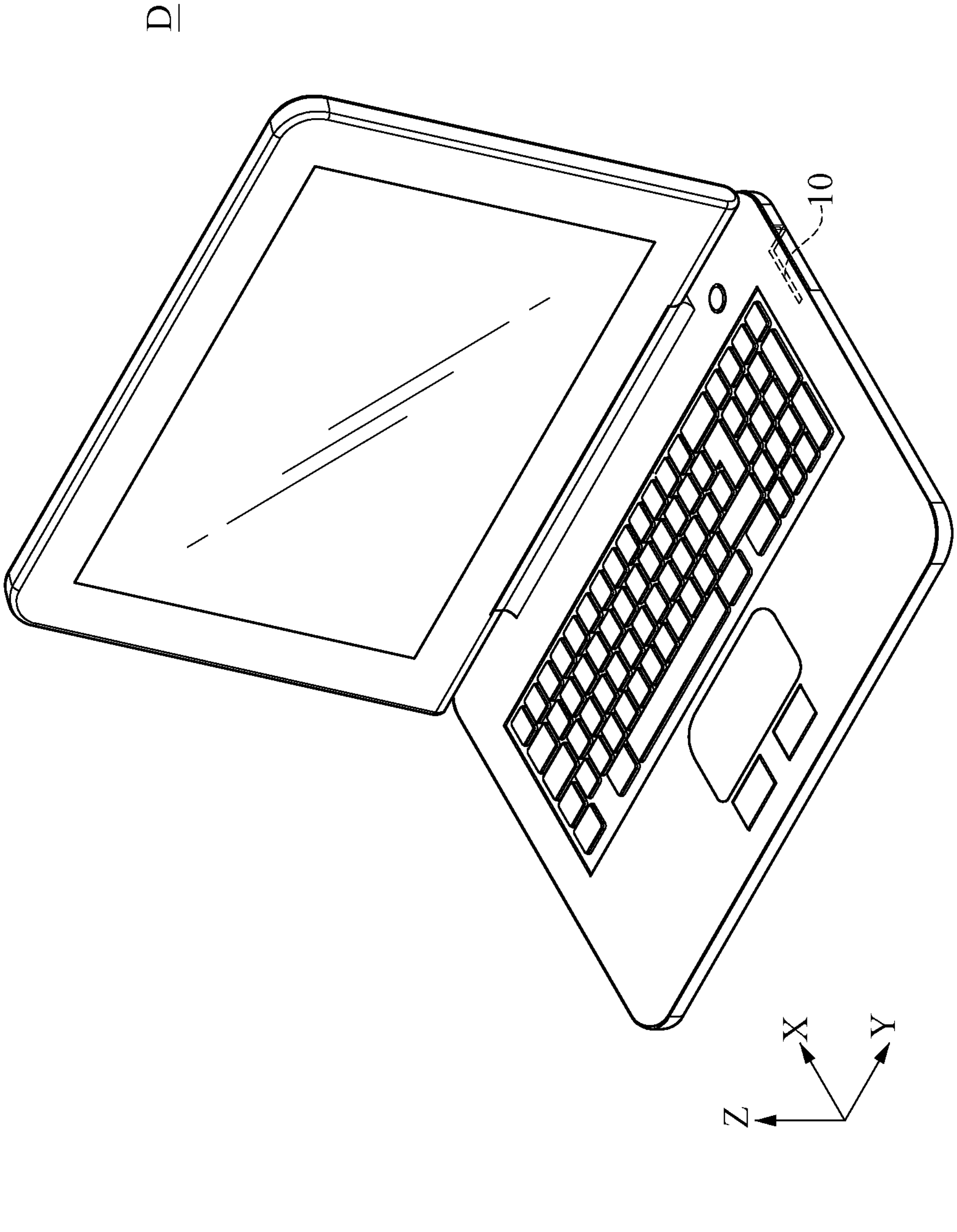
FIG. 1 is a schematic view of an electronic device of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, signals or the like, which are for distinguishing one component/signal from another one only, and are not intended to, nor should be construed to impose any substantive limitations on the components, signals or the like. In addition, the term “connect” used herein refers to a physical connection between two elements, which can be a direct connection or an indirect connection. The term “coupling to” used herein refers to two elements being separated and having no physical connection, and an electric field generated by a current of one of the two elements excites that of the other one.

First Embodiment

Referring to FIG. 1, an embodiment of the present disclosure provides an electronic device D. The electronic device D may have a function of transmitting and receiving radio frequency (RF) signals. For example, the electronic device D can be a smartphone, a tablet, or a laptop, but the present disclosure is not limited thereto. In addition, for example, the electronic device D can generate an operating frequency range between 2400 MHz and 2500 MHz and between 5150 MHz and 7125 MHz, but the present disclosure is not limited to this.

Figure 2:
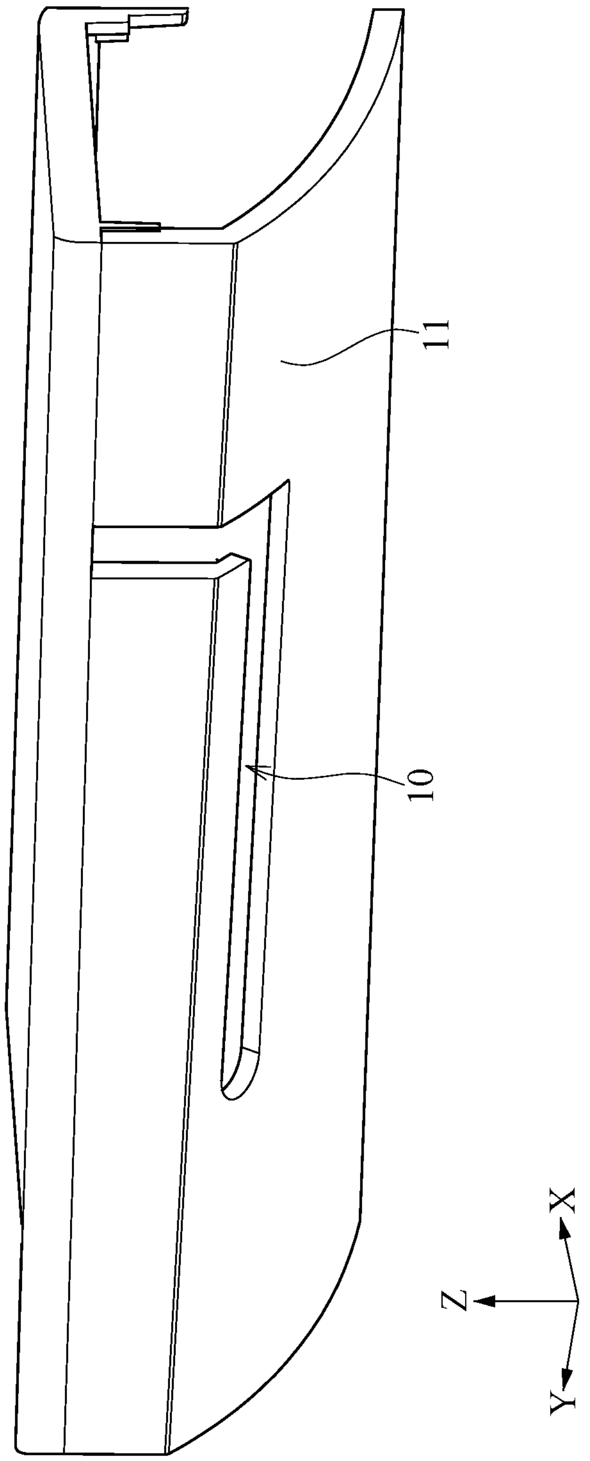
FIG. 2 is a schematic partial perspective view of the electronic device of the present disclosure.
Figure 3:
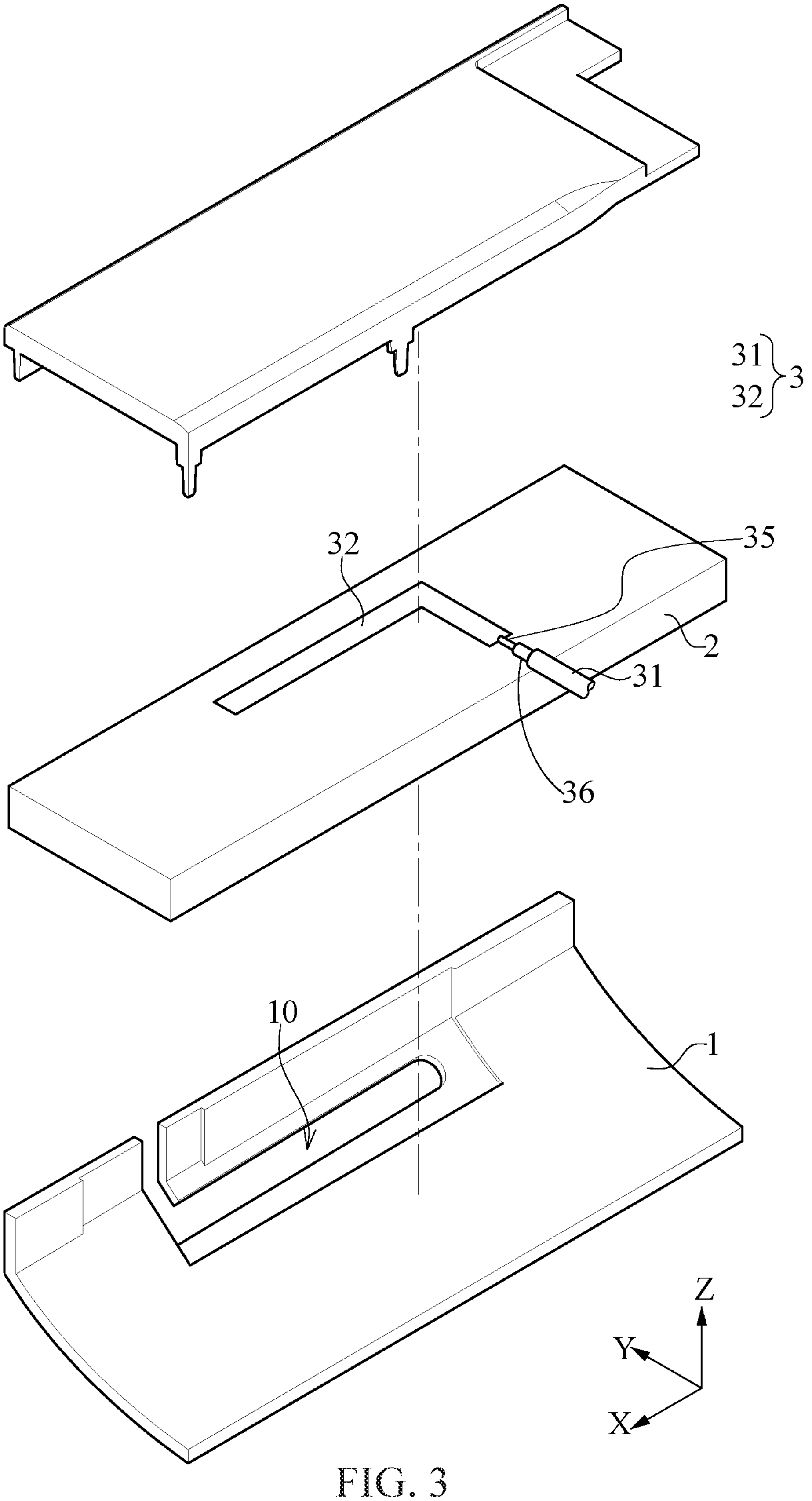
FIG. 3 is a schematic view of a metal housing of the electronic device and an antenna feeding module of the present disclosure.
Figure 4:
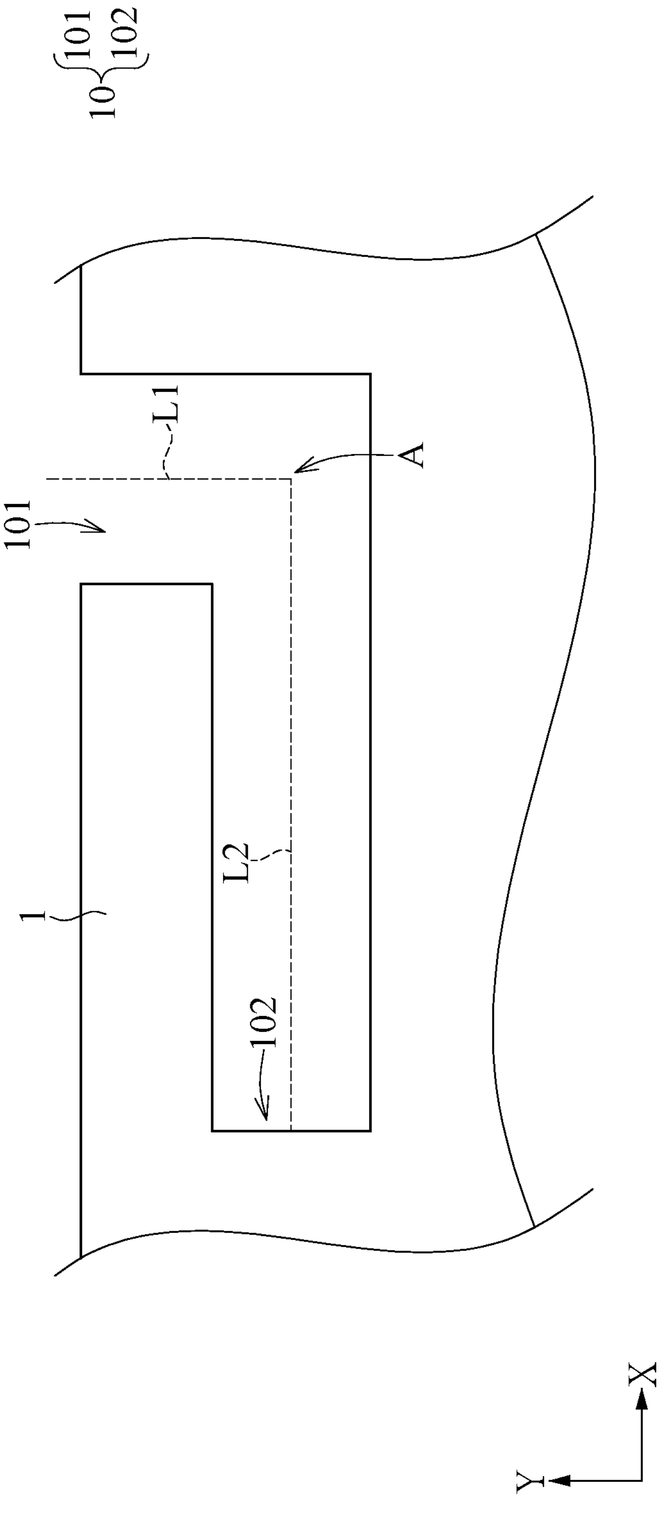
FIG. 4 is a schematic view of the metal housing with a slot of the electronic device of the present disclosure.

Referring to FIG. 2, FIG. 3 and FIG. 4, FIG. 2 is a schematic partial perspective view of the electronic device of the present disclosure. FIG. 3 is a schematic view of a metal housing of the electronic device and an antenna feeding module of the present disclosure. FIG. 4 is a schematic view of the metal housing with a slot of the electronic device of the present disclosure. The electronic device D includes a metal housing 1, a carrier board 2 and a feeding circuit 3. The antenna feeding module includes the carrier board 2 and the feeding circuit 3. The metal housing 1 is provided with a slot 10, and the slot 10 includes an opening end 101 and a closed end 102. The carrier board 2 is disposed on the metal housing 1, and the feeding circuit 3 is disposed on the carrier board 2. It should be noted that the structure of the housing of the electronic device D generally includes an upper housing and a lower housing. The upper housing can be the C part of the notebook computer, and the lower housing can be the D part of the laptop. In the present disclosure, the lower housing of the metal housing 1 is provided with the slot 10. For example, the slot 10 can be formed along the sides and bottom of the lower housing and has an L-shaped shape, but the present disclosure does not limit the shape of the slot 10. In addition, the material of the carrier board 2 is not limited thereto either.

Figure 5:
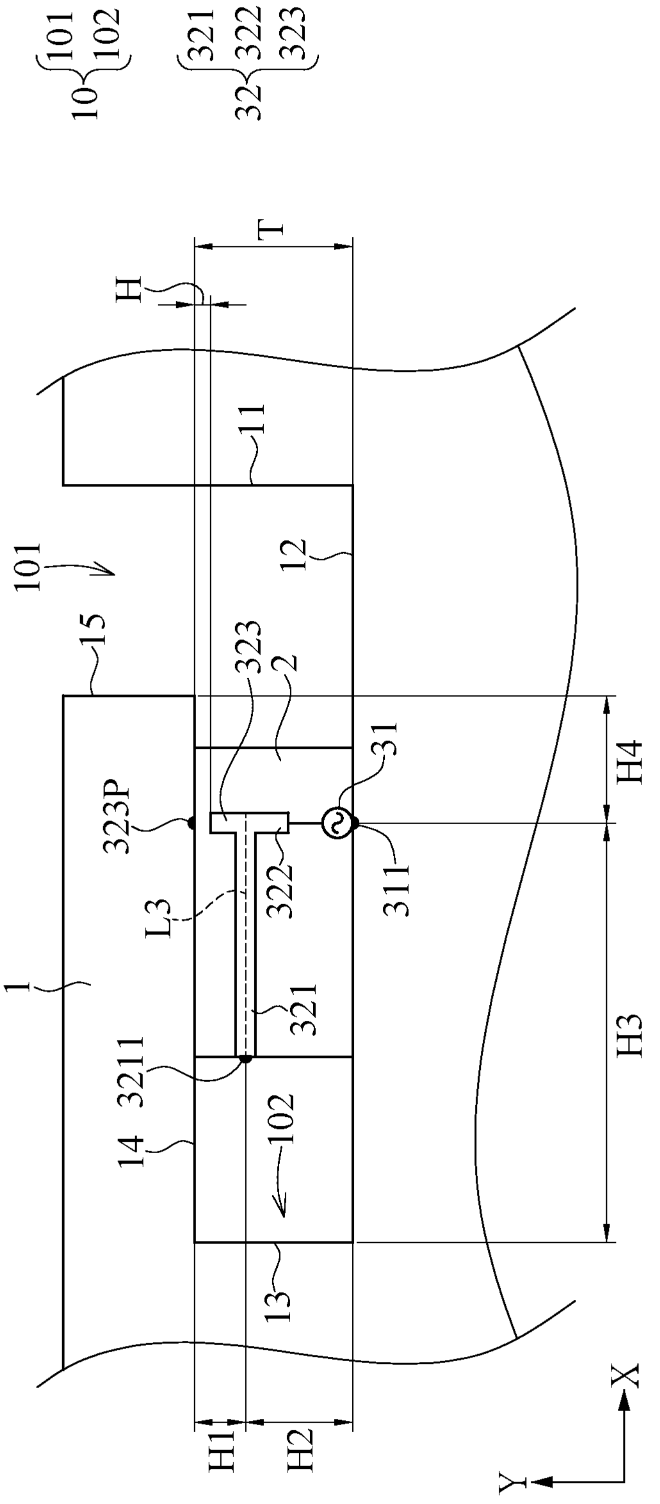
FIG. 5 is a schematic view of the slot of the metal housing and the antenna feeding module of the electronic device of the present disclosure.

Referring to FIG. 4 and FIG. 5, FIG. 5 is a schematic view of the slot of the metal housing and the antenna feeding module of the electronic device of the present disclosure. FIGS. 4 and 5 illustrate the projection of the slot of the metal housing and the antenna feed module on the X-Y plane as an example. The slot 10 is provided on the metal housing 1, and the slot 10 includes the opening end 101 and a closed end 102. The feeding circuit 3 includes a feeding element 31 and a radiating element 32. The feeding element 31 includes a feeding end 35 and a grounding end 36. The grounding end 36 is connected to the ground of the carrier board 2. The ground of carrier board 2 is connected to the metal housing 1. The vertical projection of the radiating element 32 on the metal housing 1 at least partially overlaps or completely overlaps the slot 10. The radiating element 32 includes a radiating branch 321, a feeding portion 322 and a coupling portion 323. The radiating branch 321 is disposed between the coupling portion 323 and the feeding portion 322. The radiating branch 321, the feeding portion 322 and the coupling portion 323 are connected to one another at a junction. The radiating branch 321 extends along the negative X-axis direction relative to the junction and the extension direction thereof faces the closed end 102. The feeding portion 322 is connected to the feeding element 31. The coupling portion 323, the radiating branch 321, and the feeding portion 322 form a T-shape. There is a coupling gap between the coupling portion 323 and the metal housing 1, and the width H of the coupling gap is less than 0.5 times the width of the slot 10. Preferably, the width H of the coupling gap is less than 1 mm. The coupling gap may be the shortest distance between the coupling portion 323 and the inner surface of the metal housing 1. In addition, for example, the feeding element 31 may be a coaxial cable, and the radiating element 32 may be a metal sheet, a microstrip line, a metal wire, or other conductive body with conductive effect.

Figure 6:
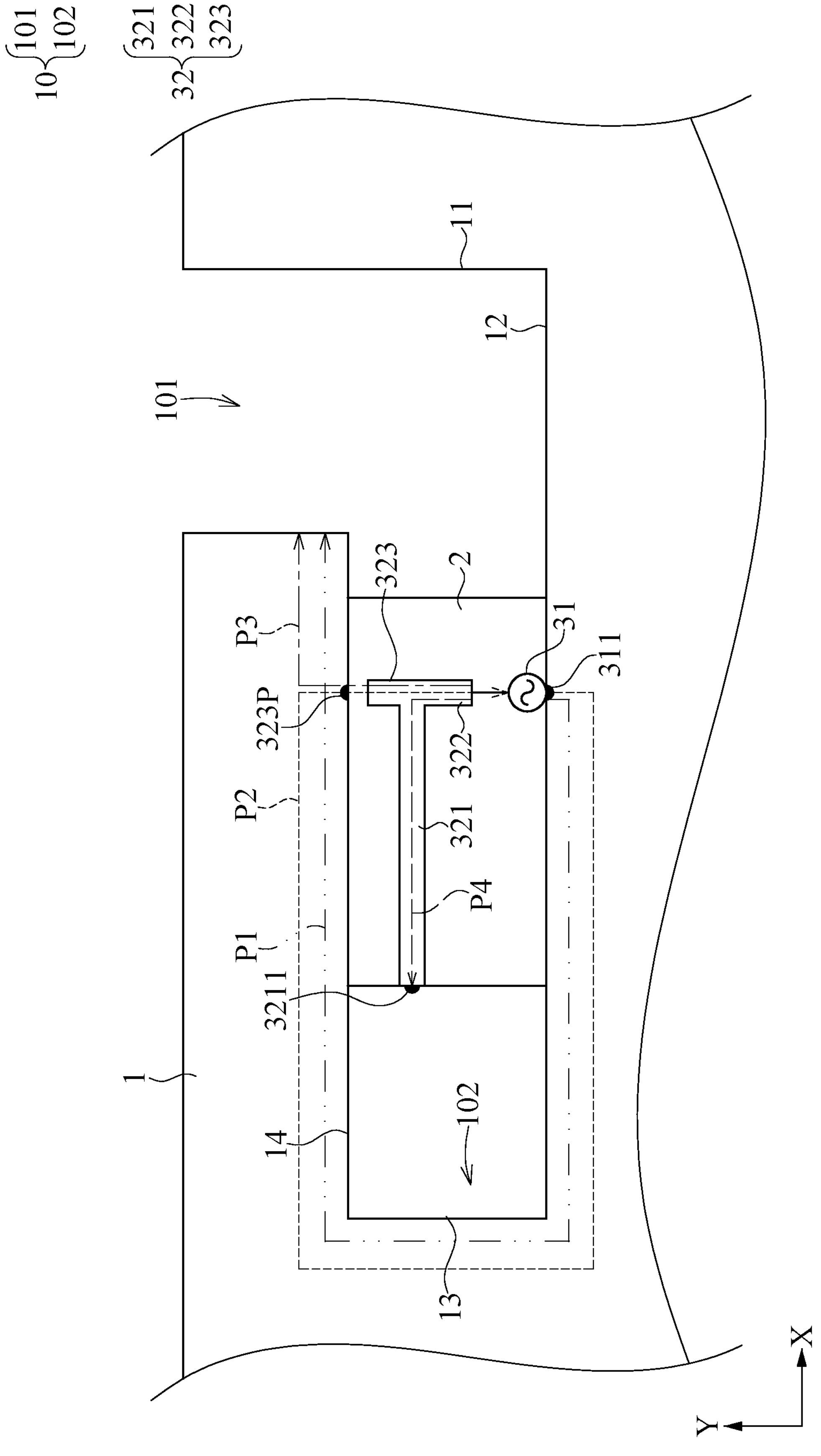
FIG. 6 is a schematic diagram of a first resonance path, a second resonance path, a third resonance path, and a fourth resonance path of the electronic device in a first embodiment of the present disclosure.

Referring to FIG. 6, FIG. 6 is a schematic diagram of a first resonance path, a second resonance path, a third resonance path, and a fourth resonance path of the electronic device in the first embodiment of the present disclosure. FIG. 6 shows the projection of the slot of the metal housing and the antenna. The feeding element 31 is connected to the feeding portion 322 to feed signal to the radiating element 32, so that the radiating element 32 excites the metal housing 1 (i.e., signal fed into the slot 10 of the metal housing 1), so that the metal housing 1 forms an antenna radiating portion in the peripheral area of the slot 10, and generate multiple resonance modes with different frequency ranges. For example, the feeding circuit 3 is used to excite the metal housing 1, so that the metal housing 1 and the radiating element 32 generate a first resonance path P1 with a first resonance mode; or, the feeding circuit 3 is used to excite the metal housing 1 causes the coupling portion 323 and the metal housing 1 to be coupling to each other to form a coupling capacitor, and the coupling capacitor forms an electrical path in the coupling gap and generates a second resonance path P2 with a second resonance mode. In addition, the feeding circuit 3 can also excite the metal housing 1, so that the coupling portion 323 and the metal housing 1 are coupling to each other to generate a third resonance path P3 with a third resonance mode and a fourth resonance path P4 with a fourth resonance mode. The first resonance mode, the second resonance mode, the third resonance mode, and the fourth resonance mode are different from each other.

Continuing to refer to FIG. 6, the first resonance path P1, the second resonance path P2, the third resonance path P3, and the fourth resonance path P4 will be described in further detail. A position where the slot 10 is provided with the metal housing 1 is further defined. The metal housing 1 has a first slot wall 11, a second slot wall 12, a third slot wall 13, a fourth slot wall 14, and a fifth slot wall 15, and a position where the slot 10 is formed. The first slot wall 11 is parallel to the fifth slot wall 15, the second slot wall 12 is perpendicular to the first slot wall 11 and parallel to the fourth slot wall 14, and the third slot wall 13 is parallel to the first slot and is connected between the second slot wall 12 and the fourth slot wall 14. FIG. 6 shows the path of the first resonance path P1. The first resonance path P1 includes a first section, a second section, a third section, and a fourth section. The first section Is a horizontal line segment from the vertical projection position 311 of the feeding element 31 on the metal housing 1 to the third slot wall 13, the second section is the vertical line segment with the same length as the third slot wall 13, and the third section is a horizontal line segment from a coupling point 323P between the coupling portion and the metal housing to the third slot wall 13, and the fourth section is a horizontal line segment from the coupling point 323P to the fifth slot wall 15. The first resonance path P1 does not pass through the radiating element 32. It is worth mentioning that the path length of the first resonance path P1 is about quarter-wavelength corresponding to 2400 MHz, and the first resonance mode contributed by the first resonance path P1 covers a first operating frequency band between 2400 MHz and 2484 MHz. Referring to FIG. 3, please note that the vertical projection position 311 on the metal housing 1 may be the vertical projection position of the grounding end 36 of the feeding element 31 on the metal housing 1.

Referring to FIG. 6, the second resonance path P2 includes the above-mentioned first section, the second section, the third section, and a vertical line segment from the coupling point 323P to the vertical projection position 311 on the metal housing 1. The third resonance path P3 includes a vertical line segment between the coupling point 323P and the vertical projection position 311 of the feeding element 31 on the metal housing 1 and the fourth section described above. The fourth resonance path P4 includes a vertical line segment from the vertical projection position 311 of the feeding element 31 on the metal housing 1 to the radiating branch 321 and the radiating branch 321 itself. The second resonance mode, the third resonance mode, and the fourth resonance mode contributed by the second resonance path P2, the third resonance path P3, and the fourth resonance path P4 cover a second operating frequency band which is ranged between 5150 MHz and 7125 MHz.

It can be seen from the above that the difference between the first resonance path P1 and the second resonance path P2, the third resonance path P3 and the fourth resonance path P4 is that when the antenna operating frequency is lower than 2500 MHz, the coupling portion 323 and the metal housing 1 may not be coupling to each other so that an open-circuit state is between the coupling portion 323 and the metal housing 1. The feeding circuit 3 excites the metal housing 1 to generate the first resonance path P1; when the antenna operating frequency is higher than 5000 MHz, the coupling portion 323 and the metal housing 1 are coupling to each other to form an electrical path. Therefore, the connection between the coupling portion 323 and the metal housing 1 is equivalent to a short-circuit state, and the feeding circuit 3 excites the metal housing 1 to generate the second resonance path P2, the third resonance path P3 and the fourth resonance path P4.

For example, the center frequency of the second resonance mode is 5150 MHz, the center frequency of the third resonance mode is 6200 MHz, and the center frequency of the fourth resonance mode is 6800 MHz. Therefore, the path length of the second resonance path P2 is about half-wavelength of 5150 MHz, the path length of the third resonance path P3 is about quarter-wavelength of 6200 MHz, and the path length of the fourth resonance path P4 is about quarter-wavelength of 6800 MHz. However, the present disclosure is not limited to this. In other words, the second resonance path P2, the second resonance path P3, and the fourth resonance path P4 may adjust their respective center frequencies and frequency ranges due to changes in path lengths.

In view of the above, referring again to FIGS. 4 and 5, the slot 10 defines a first axis L1 and a second axis L2 according to its extending directions. The first axis L1 is parallel to the extension of the slot 10 toward the opening end 101. The second axis L2 is parallel to the extending direction of the slot 10 toward the closed end 102, the first axis L1 and the second axis L2 intersect at an intersection point A. The distance between the closed end 102 and the intersection point A is less than or equal to quarter-wavelength of the lowest operating frequency within the first operating frequency band (2400 MHz to 2484 MHz). Therefore, the size of the slot 10 of the slot antenna structure in the present disclosure can be much smaller than that of the slot in the prior art. For example, the length of the slot of a general slot antenna structure is about 45 mm, while the length of the slot 10 of the slot antenna structure in the present disclosure can be reduced to about 10 to 13 mm.

In addition, as shown in FIG. 5, in this embodiment, the vertical projection of the radiating branch 321 on the metal housing 1 defines a center line L3. There is a first predetermined distance H1 between the center line L3 and the fourth slot wall 14. There is a second predetermined distance H2 between the center line L3 and the second slot wall 12. The first predetermined distance H1 is smaller than the second predetermined distance H2. In addition, there is a third predetermined distance H3 between the vertical projection position 311 of the feeding element 31 on the metal housing 1 and the third slot wall 13. There is a fourth predetermined distance H4 between the vertical projection position 311 of the feeding element 31 on the metal housing and the fifth slot wall 15. The third predetermined distance H3 is greater than the fourth predetermined distance H4. Therefore, the present disclosure adjusts the relative position of the radiating element 32 of the antenna feeding module in the slot 10 to change the first resonance path P1, the second resonance path P2, the third resonance path P3, and the fourth resonance path to adjust the respective center frequencies and frequency ranges of the first resonance mode, the second resonance mode, the third resonance mode, and the fourth resonance mode to meet different broadband requirements.

In addition, it is worth mentioning that in the present disclosure, the extending direction of the radiating branch 321 is toward the closed end 102, so as to reduce the radiation power of the overall antenna structure to avoid the specific absorption rate (SAR) value of electromagnetic wave energy. Too high, but the present disclosure is not limited to this. In other embodiments, the extending direction of the radiating branch 321 may also be far away from the closed end 102, that is, toward the open end 101, so as to improve the gain and radiating efficiency of the overall antenna structure.

Second Embodiment

Figure 7:
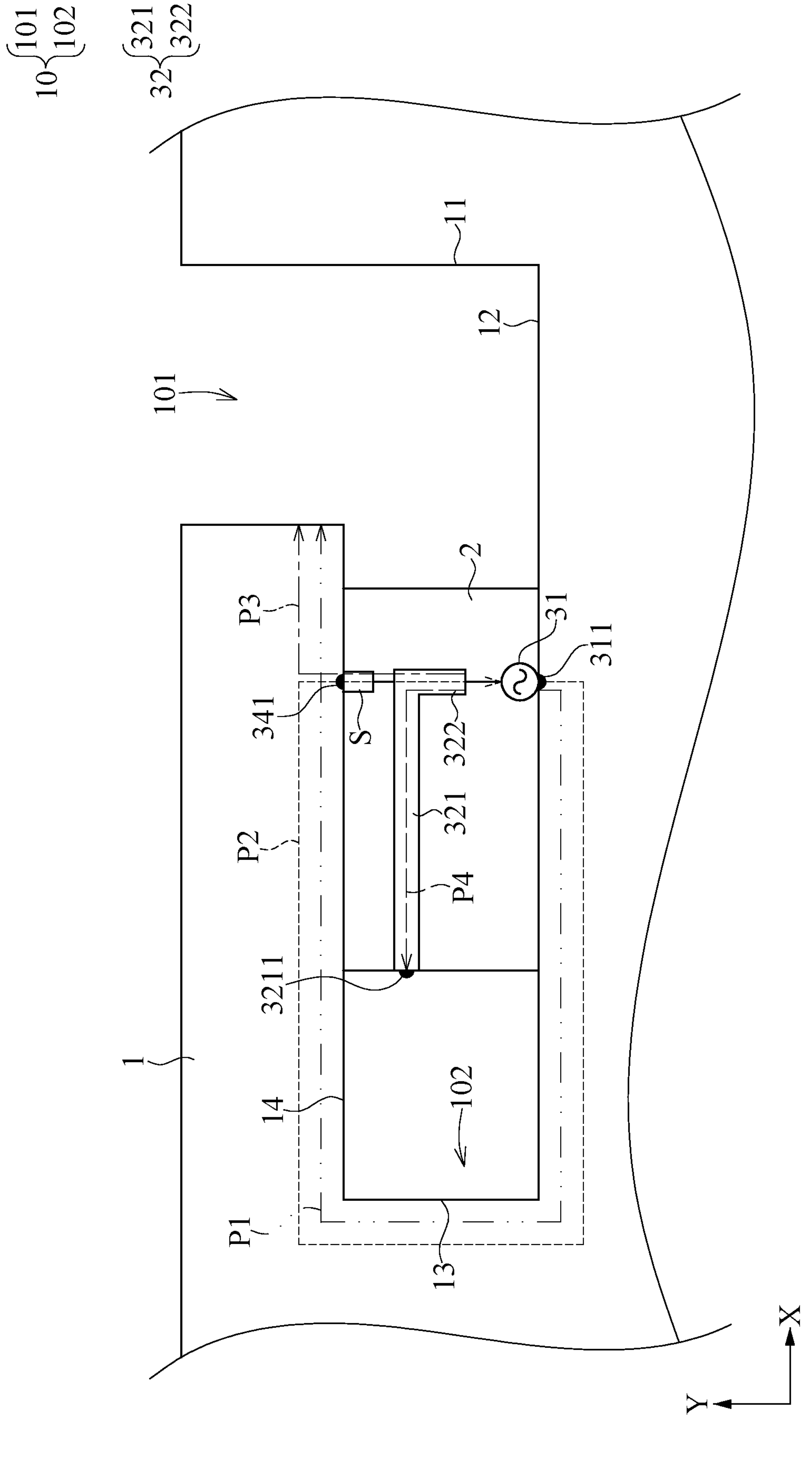
FIG. 7 is a schematic diagram of a first resonance path, a second resonance path, a third resonance path, and a fourth resonance path of the electronic device in a second embodiment of the present disclosure.
Figure 8:
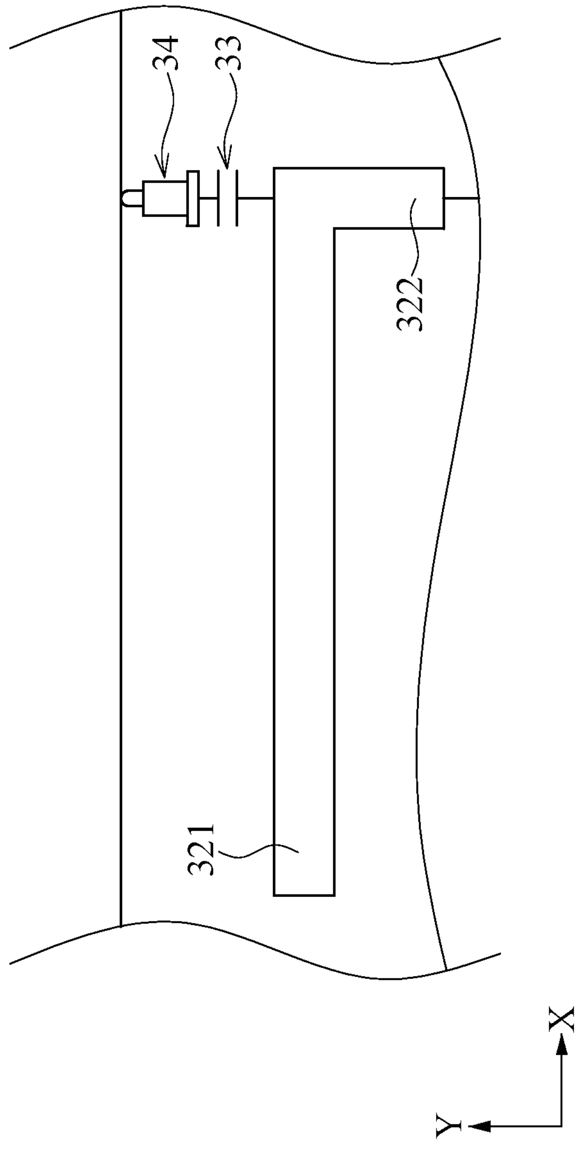
FIG. 8 is a schematic view of a radiating element, a capacitor element and a connecting element in the second embodiment of the present disclosure.

Referring to FIG. 7 and FIG. 8, FIG. 7 is a schematic diagram of a first resonance path, a second resonance path, a third resonance path, and a fourth resonance path of the electronic device in the second embodiment of the present disclosure. FIG. 7 illustrates the projection of the slot of the metal housing and the antenna feeding module on the X-Y plane as an example. FIG. 8 is a schematic view of a radiating element, a capacitor element and a connecting element in the second embodiment of the present disclosure. From the comparison between FIG. 7 and FIG. 6, it can be seen that the difference between the second embodiment and the first embodiment lies in the structure of the antenna structure. In addition, it should be noted that other structures of the electronic device D provided in the second embodiment are similar to those of the first embodiment, and will not be repeated here.

In view of the above, in this embodiment, the metal housing 1 is provided with a slot 10, and the slot 10 includes an opening end 101 and a closed end 102. The feeding circuit 3 includes a feeding element 31, a radiating element 32, a capacitor element 33 and a connecting element 34. The capacitor element 33 and the connecting element 34 together form a switch element S. In the present disclosure, the capacitance value of the capacitor element 33 is less than or equal to 0.4 pF. In addition, for example, the capacitor element 33 may be, for example, but not limited to, an SMT capacitor, and the connecting element 34 may be, for example, but not limited to, a pogo pin. It can be seen from FIG. 8 that in this embodiment, the capacitor element 33 is connected between the connecting element 34 and the radiating branch 321. One end of the connecting element 34 is connected to the capacitor element 33, and the other end of the connecting element 34 contacts the metal housing 1.

In view of the above, the feeding element 31 is connected to the feeding portion 322 to feed signal to the radiating element 32, so that the radiating element 32 excites the metal housing 1. The metal housing 1 forms an antenna radiating portion in the peripheral area of the slot 10, and generates multiple resonance modes with multiple different frequency ranges.

Referring to FIG. 7 and comparing FIG. 7 with FIG. 6, it can be seen that the first resonance path P1, the second resonance path P2, the third resonance path P3, and the fourth resonance path P4 in the second embodiment have the same path composition as the first embodiment except that the path definitions of the third section and the fourth section are slightly different. Specifically, in this embodiment, the first resonance path P1 includes a first section, a second section, a third section, and a fourth section. The path compositions of the first section and the second section are the same as in the first embodiment, which will not be repeated here. The third section is a horizontal line section from a contact point 341 between the connecting element 34 and the metal housing 1 to the third slot wall 13, and the fourth section is a horizontal line segment from the contact point 341 to the fifth slot wall 15.

In view of the above, the second resonance path P2 includes the above-mentioned first section, the second section, the third section, and a vertical line segment from the contact point 341 to the vertical projection position 311 of the feeding element 31 on the metal housing 1. The third resonance path P3 includes a vertical line segment from the contact point 341 to the vertical projection position 311 of the feeding element 31 on the metal housing 1 and the above-mentioned fourth section. The fourth resonance path P4 includes a vertical line segment from the vertical projection position 311 of the feeding element 31 on the metal housing 1 to the radiating branch 321 and the radiating branch 321 itself.

It can be seen from the above that the difference between the first resonance path P1 and the second resonance path P2, the third resonance path P3 and the fourth resonance path P4 is that when the antenna operating frequency is lower than 2500 MHz, the capacitor element 33 is equivalent to an open-circuit state. The feeding circuit 3 excites the metal housing 1 to generate the first resonance path P1; when the antenna operating frequency is higher than 5000

MHz, the capacitor element 33 is equivalent to a short-circuit state, and the feeding circuit 3 excites the metal housing 1 to generate the second resonance path P2, the third resonance path P3 and the fourth resonance path P4. And the second resonance path P2 and the second resonance path P3 both include the connecting element 34 and the capacitor element 33.

Third Embodiment

Figure 9:
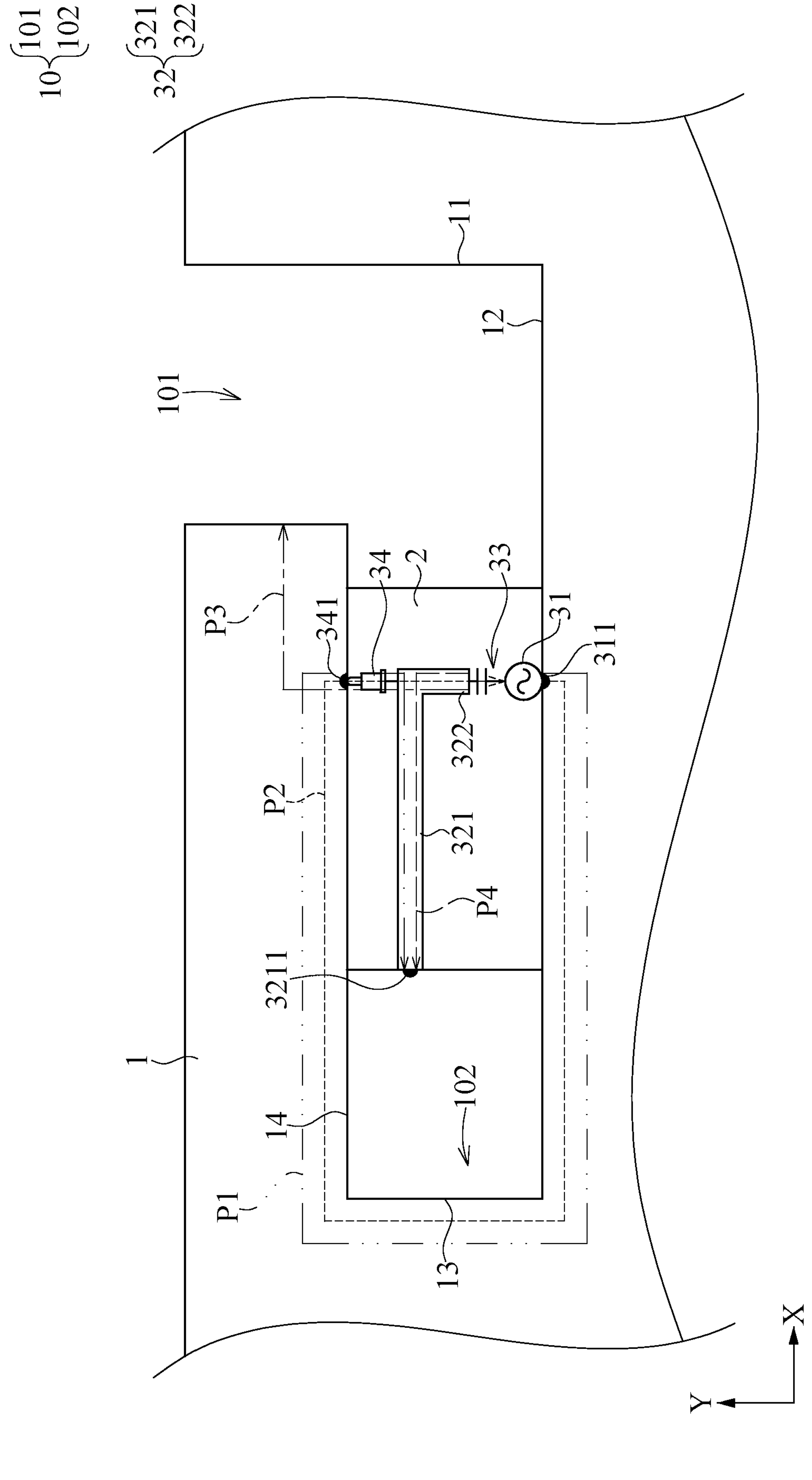
FIG. 9 is a schematic diagram of a first resonance path, a second resonance path, a third resonance path, and a fourth resonance path of the electronic device in a third embodiment of the present disclosure.

Referring to FIG. 9, FIG. 9 is a schematic diagram of a first resonance path, a second resonance path, a third resonance path, and a fourth resonance path of the electronic device in a third embodiment of the present disclosure. FIG. 9 illustrates the projection of the slot of the metal housing and the antenna feeding module on the X-Y plane as an example. From the comparison between FIG. 9 and FIG. 7, it can be seen that the difference between the third embodiment and the second embodiment lies in the structure of the antenna structure. More precisely, the difference lies in the structure of the feeding circuit 3. In other words, the electronic device D provided by the present disclosure may have different antenna structures. In addition, it should be noted that other structures of the electronic device D provided in the third embodiment are similar to the foregoing first and second embodiments, and will not be repeated here.

In this embodiment, the capacitor element 33 is electrically connected to the radiating element 32. The connecting element 34 is connected between the radiating element 32 and the metal housing 1. Furthermore, it can be seen from FIG. 9 that, in this embodiment, the capacitor element 33 is connected between the feeding element 31 and the feeding portion 322, and one end of the connecting element 34 is connected to the radiating branch 321, the other end of the connecting element 34 contacts the metal housing 1.

Comparing FIG. 9 with FIG. 7, it can be seen that the third embodiment is compared with the second embodiment, the paths of the second resonance path P2, the third resonance path P3, and the fourth resonance path P4 are the same, and only the composition of the first resonance path P1 is different. Specifically, in this embodiment, the first resonance path P1 includes the first section, the second section, the third section, a vertical line segment from the contact point 341 between the connecting element 34 and the metal housing 1 to the radiating branch 321, and the radiating branch 321. The path definitions of the first section, the second section, and the third section are the same as those of the second embodiment, and will not be repeated.

Comparing FIG. 9 with FIG. 7, it can be seen that the capacitor element 33 in the second embodiment is connected between the connecting element 34 and the radiating branch 321 (see FIG. 7), while the capacitor element 33 in the third embodiment is connected between the feeding element 31 and the feeding portion 322 (see FIG. 9). That is to say, the capacitor element 33 in the second embodiment and the present embodiment is located at a different position in the feeding circuit 3. As a result, the first resonance path P1 of the second embodiment is also different from the first resonance path P1 of this embodiment. Briefly, the first resonance path P1 of the second embodiment extends to the fifth slot wall 15, and the first resonance path P1 of this embodiment extends to an open end 3211 of the radiating branch. When the first resonance path P1 extends to the fifth slot wall 15, the antenna gain and radiation efficiency of the first operating frequency band between 2400 MHz and 2484 MHz covered by the first resonance mode generated by the antenna structure can be improved. When the first resonance path P1 extends to the open end 3211 of the radiating branch, the radiation power of the overall antenna structure can be reduced to avoid excessively high SAR values.

Figure 10:
FIG. 10 is a schematic diagram of the performance of an antenna structure of the electronic device of the present disclosure.

Referring to FIG. 10, FIG. 10 is a schematic diagram of the performance of an antenna structure of the electronic device of the present disclosure. The curve represented by the dashed line represents the main antenna provided in the electronic device. It can be seen from FIG. 10 that with the antenna structure of the present disclosure, the frequency range of the first resonance mode (2400 MHz to 2484 MHz). The frequency range (5150 MHz to 7125 MHz) may be jointly covered by the second resonance mode, the third resonance mode and the fourth resonance mode to meet the needs of users.

One of the beneficial effects of the present disclosure is that the electronic device and antenna feeding module provided by the present disclosure through technical solutions of "feeding circuit 3 exciting the metal housing, so that the coupling portion 323 and the metal housing 1 are mutually coupling to each other to form an electrical path and "the capacitor element 33 electrically connected to the radiating element 32, and the connecting element 34 connected between the radiating element 32 and the metal housing 1". To achieve the wide-frequency operation requirements of the low-frequency/high-frequency band is by utilizing the low-frequency/high-frequency characteristics of virtual coupling capacitor or physical capacitor element to configure the metal housing with a slot to have different resonance paths.

Furthermore, the present disclosure uses the slot 10 (the distance between the closed end 102 and the intersection point A is less than or equal to quarter-wavelength of the lowest operating frequency in the first operating frequency band covered by the first resonance mode, see FIG. 4). Thus, the size of the slot 10 the present disclosure can be much smaller than that of the slot in the prior art.

More specifically, the present disclosure adjusts the relative position of the radiating element 32 in the antenna feed module in the slot 10 (the first predetermined distance H1, the second predetermined distance H2, the third predetermined distance H3, and the fourth predetermined distance. H4), by changing the path lengths of the first resonance path P1, the second resonance path P2, the second resonance path P3, and the fourth resonance path P4 to adjust the respective center frequencies and frequency ranges of the first resonance mode, the second resonance mode, the third resonance mode, and the fourth resonance mode to meet different broadband requirements. In addition, the present disclosure can also adjust the extension direction of the radiating branch 321 to improve the gain and radiation efficiency of the overall antenna structure, or to avoid excessively high SAR values.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:

a metal housing, having a slot, the slot including an opening end and a closed end;

a carrier board, disposed on the metal housing; and a feeding circuit, disposed on the carrier board, the feeding circuit including a feeding element and radiating element, a vertical projection of the radiating element on the metal housing is completely positioned in the slot, the radiating element and the metal housing are separated from and not in contact with each other, the radiating element including a coupling portion, a radiating branch and a feeding portion, the radiating branch disposed between the coupling portion and the feeding portion, the coupling portion is closer to the metal housing than the radiating branch, the feeding portion connected to the feeding element, a coupling gap being between the coupling portion and the metal housing, and the width of the coupling gap is less than 0.5 times the width of the slot;

wherein the feeding circuit is used to excite the metal housing so that the metal housing and the radiating element generate a first resonance path with a first resonance mode;

wherein the coupling portion and the metal housing are coupling to each other to form an electrical path and a second resonance path with a second resonance mode is generated, and the first resonance mode is different from the second resonance mode.

2. The electronic device according to claim 1, wherein the slot defines a first axis and a second axis according to its extending directions, the first axis is parallel to the extending direction of the slot toward the opening end, and the second axis is parallel to the extending direction of the slot toward the closed end, the first axis and the second axis intersect at an intersection point, the distance between the closed end and the intersection point is less than or equal to a quarter-wavelength of the lowest operating frequency within the first resonance mode.

3. The electronic device according to claim 1, wherein the extending direction of the radiating branch is toward the closed end.

4. The electronic device according to claim 1, wherein the extending direction of the radiating branch is away from the closed end.

5. The electronic device according to claim 1, wherein the metal housing has a first slot wall, a second slot wall, a third slot wall, a fourth slot wall, and a fifth slot wall at the position where the slot is formed, the first slot wall is parallel to the fifth slot wall, the second slot wall is parallel to the fourth slot wall, the third slot wall is connected between the second slot wall and the fourth slot wall, the vertical projection of the radiating branch on the metal housing defines a center line, a first predetermined distance is between the center line and the fourth slot wall, a second predetermined distance is between the center line and the second slot wall, and the first predetermined distance is smaller than the second predetermined distance.

6. The electronic device according to claim 5, wherein a third predetermined distance is between the vertical projection position of the feeding element on the metal housing and the third slot wall, a fourth predetermined distance between the vertical projection position of the feeding element on the metal housing and the fifth slot wall, and the third predetermined distance is greater than the fourth predetermined distance.

7. The electronic device according to claim 5, wherein the metal housing has a first section, a second section, a third section and a fourth section, the first section is a horizontal line segment from the vertical projection position of the feeding element on the metal housing to the third slot wall, and the second section is a vertical line segment with the same length as the third slot wall, the third section is a horizontal line segment from a coupling point between the coupling portion and the metal housing to the third slot wall, and the fourth section is a horizontal line segment from the coupling point to the fifth slot wall; wherein the first resonance path includes the first section, the second section, the third section, and the fourth section;

wherein the second resonance path includes the first section, the second section, the third section and a vertical line segment from the coupling point to the vertical projection position of the feeding element on the metal housing; wherein the coupling portion and the metal housing are coupling to each other to further generate a third resonance path with a third resonance mode and a fourth resonance path with a fourth resonance mode, the third resonance path includes the vertical line segment from the coupling point to the vertical projection position of the feeding element on the metal housing and the fourth section, and the fourth resonance path includes a vertical line segment between the vertical projection position of the feeding element on the metal housing and the radiating branch and the radiating branch.

8. An antenna feeding module, disposed in a metal housing, the metal housing having a slot, the antenna feeding module comprising:

a carrier board, disposed in the metal housing; and a radiating element, disposed on the carrier board, a vertical projection of the radiating element on the metal housing is completely positioned in the slot, the radiating element and the metal housing are separated from and not in contact with each other, the radiating element including a coupling portion, a radiating branch and a feeding portion, the radiating branch disposed between the coupling portion and the feeding portion, the feeding portion connected to the feeding element, a coupling gap being between the coupling portion and the metal housing, and the width of the coupling gap is less than 0.5 times the width of the slot.

* * * * *